United States Patent [19]

Doell

[11] 4,189,721

[45] Feb. 19, 1980

[54] PERSONAL ALARM SYSTEM

[76] Inventor: Raymond Doell, 9601 Shore Rd., Brooklyn, N.Y. 11209

[21] Appl. No.: 879,787

[22] Filed: Feb. 21, 1978

[51] Int. Cl.[2] .......................... G08B 1/08; H04Q 7/00

[52] U.S. Cl. ................................ 340/539; 340/164 R; 340/574; 325/364; 325/393

[58] Field of Search .................... 340/539, 164 R, 546, 340/548, 531, 574; 325/364, 393, 390; 343/225; 361/139, 160, 194

[56] References Cited

U.S. PATENT DOCUMENTS

| | | | |
|---|---|---|---|
| 3,111,656 | 11/1963 | Barrett et al. | 340/539 |
| 3,249,874 | 5/1966 | Weber | 325/364 |
| 3,604,005 | 9/1971 | Gilmore | 325/393 |
| 3,611,333 | 10/1971 | Conigliaro | 340/539 |
| 3,651,507 | 3/1972 | Abbott | 340/539 |

*Primary Examiner*—John W. Caldwell, Sr.
*Assistant Examiner*—Donnie L. Crosland
*Attorney, Agent, or Firm*—Richard L. Miller

[57] ABSTRACT

A personal alarm system includes a receiver with a relay; the relay has a pair of contacts which are normally open, and the contacts are closed on receipt of a signal received by the receiver. A warning device is connected to the relay contacts and is actuated upon closure of the relay contacts for sounding an audible alarm, so that a transmitter which transmits the signals to the receiver may actuate the warning device.

4 Claims, 2 Drawing Figures

PERSONAL ALARM SYSTEM

BACKGROUND OF THE INVENTION

Several warning systems are known, in which an alarm is sounded upon a button being pressed. These systems are, however, relatively costly and bulky, and are frequently designed to meet a particular narrow need, without being applicable to other uses.

SUMMARY OF THE INVENTION

It is accordingly an object of the present invention to devise a relatively simple system, which can be constructed from largely available components and subsystems, and which is easily converted to other uses also.

Accordingly is provided a personal alarm system, which includes a receiver provided with a first relay. The first relay has a pair of contacts, which are normally open, and the contacts are closed on receipt of a signal received by the receiver. Warning means are provided which are connected to a third relay contact and are actuated upon closure of the third relay contacts for sounding an audible alarm, so that a transmitting of the signal to the receiver will actuate the warning means.

In order to take advantage of standard components, the first relay contacts are rated at an alternating voltage of about 24 volts, and the warning means are rated at an alternating voltage of about 120 Volts. A transformer is connected to a 120 Volts alternating current supply, and includes a step-down secondary coil for stepping down a 120 Volts alternating voltage to a 24 Volts alternating voltage.

A second relay which has a pair of second relay contacts normally open, is connected so that the second relay coil is in series with secondary winding of the step-down transformer and the first pair of relay contacts, the transformer primary winding being connected to the 120 Volts alternating current voltage supply.

A third relay includes a relay coil and a third pair of contacts, and the third relay coil is connected in series with the second pair of relay contacts across the 120 Volts alternating current supply, the third pair of relay contacts being normally open; a manual override switch is connected in series with the warning means and the 120 Volts alternating current supply for deactivating the warning means.

The warning means, which may be a siren, a horn, or a bell, is connected in series with the third pair of relay contacts across the 120 Volts alternating current supply.

BRIEF DESCRIPTION OF THE DRAWING

The invention may be better understood by referring the accompanying drawing.

DESCRIPTION OF THE SPECIFIC EMBODIMENTS

Figure 1:
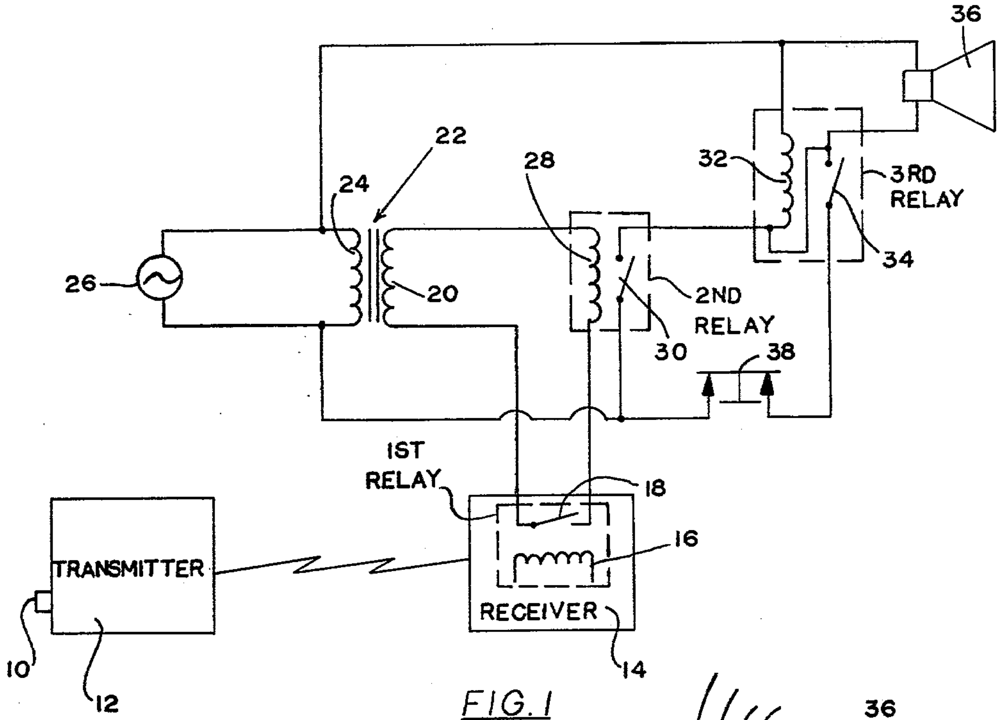
FIG. 1 is a schematic circuit diagram, of the invention.

In carrying the invention into practice, a pushbutton 10 or the like of a transmitter 12, when depressed, transmits a signal, which is received by a receiver 14, best seen in FIG. 1. A relay coil 16 in the receiver 14, on receipt of the signal, causes a pair of contacts 18 to close. A receiver 14 of this type is commercially available in the form, for example, of a garage door opener receiver, the transmitter 12 being a complementary garage door opener transmitter.

The pair of contacts 18 is connected in series with a secondary winding 20 of a step-down transformer 22, the primary winding 14 of the step-down transformer 22 being connected to an alternating current supply 26, supplying a voltage of 120 Volts. The series circuit is completed by the inclusion of a relay coil 28, having a pair of normally open contacts 30. The primary winding of the step-down transformer is normally rated for 120 Volts, and its secondary winding is normally rated for about 24 Volts. A first parallel combination of a relay coil 32, having a pair of normally open contacts 34 and the warning means 36 are connected in a first series combination with a second parallel combination of contacts 30 and a second series combination of contacts 34 and normally closed push button switch 38. Said first series combination is connected in parallel with primary 24 of step-down transformer 22 across alternating current supply 26.

The invention described achieves the unobvious result that warning device 36 can be activated by a hand held transmitter 12 and only deactivated by a simple normally closed push button switch 38 with only the simplest off the shelf components and subsystems and without the use of latching relays.

Figure 2:
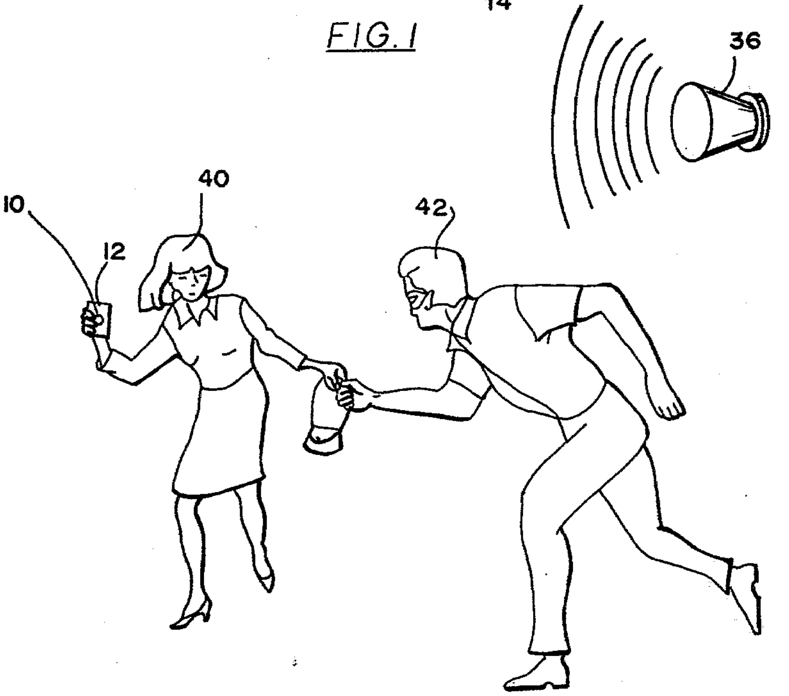
FIG. 2 illustrates an application of the invention.

FIG. 2 shows how the system is operated; a victim 40, attacked, for example, by a crimal 42, presses the actuating button 10 of the hand-held transmitter 12, thus activates the warning means 36, which in turn sounds an audible warning with a view of summoning aid to the victim 40 attacked by the criminal 42. The foregoing is considered as illustrative only of the principles of the present invention; since numerous modifications and changes will readily occur to those skilled in the art, it is not intended to limit the invention to the exact construction and operation shown and described, the appended claims encompassing any suitable modifications and equivalents of the present invention. Accordingly, without further analysis,

What is claimed is:

1. A personal alarm system, comprising in combination, a receiver unit including a receiver for receiving a signal transmitted from a transmitter and a first relay integrally connected within the receiver unit, said first relay having a first coil energized by said receiver in response to receiving said transmitted signal and a pair of first normally open contacts closeable upon energization of said first coil, a step-down transformer unit having a primary winding for connecting across a source of alternating power and a secondary winding for providing a low voltage alternating output, a second relay having a second coil and a pair of second normally open contacts closable upon energization of said second coil, said second coil connected in series with said pair of first contacts and said secondary winding, a third relay having a third coil and a pair of third normally open contacts closable upon energization of said third coil, said third coil connected in series combination with said pair of second contacts and said series combination connected in parallel across said primary winding, a warning device connected in series circuit with said pair of third contacts and said series circuit connected in parallel across said primary winding, and a coupling circuit connected between the interconnections of said warning device with said pair of third contacts and between the interconnection of said third coil with said pair of second contacts to convert said third relay into a self-holding relay, whereby a momentary transmission of said transmitted signal causes a continuous operation of said warning device.

2. A personal alarm system as in claim 1 and further comprising a normally closed contact switch connected into said series circuit for deactivating the warning system.

3. A personal alarm system as in claim 1, wherein said warning device is an audible alarm.

4. A personal alarm system as in claim 1, wherein said step-down transformer steps down a 120 Volt alternating voltage to a 24 Volt alternating voltage.

* * * * *